(12) United States Patent
Tadepalli et al.

(10) Patent No.: US 10,065,377 B2
(45) Date of Patent: *Sep. 4, 2018

(54) METHOD OF FORMING A MULTI-COMPONENT REINFORCED COMPOSITE

(71) Applicant: JOHNS MANVILLE, Denver, CO (US)

(72) Inventors: Rajappa Tadepalli, Chennai (IN); Klaus Friedrich Gleich, Nuremberg (DE); Jawed Asrar, Englewood, CO (US); Kiarash Alavi, Littleton, CO (US)

(73) Assignee: Johns Manville, Denver, CO (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/844,573

(22) Filed: Sep. 3, 2015

(65) Prior Publication Data

US 2015/0375460 A1 Dec. 31, 2015

Related U.S. Application Data

(63) Continuation of application No. 13/335,813, filed on Dec. 22, 2011, now Pat. No. 9,169,351.

(51) Int. Cl.
*B29C 67/00* (2017.01)
*B29C 67/24* (2006.01)
(Continued)

(52) U.S. Cl.
CPC ............ *B29C 67/246* (2013.01); *B29C 44/02* (2013.01); *B29C 70/04* (2013.01); *B29C 70/06* (2013.01);
(Continued)

(58) Field of Classification Search
None
See application file for complete search history.

(56) References Cited

U.S. PATENT DOCUMENTS

| | | | |
|---|---|---|---|
| 4,268,468 A | 5/1981 | Esper et al. | |
| 5,046,674 A | 9/1991 | Kolschbach et al. | |

(Continued)

FOREIGN PATENT DOCUMENTS

| | | |
|---|---|---|
| CN | 101 798 713 A | 8/2010 |
| WO | 2010040576 A1 | 4/2010 |

OTHER PUBLICATIONS

Vlasveld, D.P.N. et al; "Fiber-matrix adhesion in glass-fiber reinforced polyamide-6 silicate nanocomposites"; Composites Part A; Applied Science and Manufacturing, Jan. 1, 2005, pp. 1-11, vol. 36, No. 1, Elsevier Science Publishers B.V., Amsterdam, NL.

*Primary Examiner* — Edmund Lee
(74) *Attorney, Agent, or Firm* — Robert D. Touslee

(57) ABSTRACT

Methods of forming multi-component reinforced composites are described. The methods may include forming a particle-reinforced component and a polymer-containing component where the particle-reinforced component and the polymer-containing component are in contact with one another. The particle reinforced component may be formed by a process that includes providing reactive particles that have a reactive polymerization promoter chemically bonded or coated on the surface of the reactive particles and contacting the reactive particles with a resin solution that includes monomers of a polymer. The polymerization promoter chemically bonded or coated on the surface of the reactive particles may promote the polymerization of the monomers. The resin solution may subsequently be polymerized forming a polymer matrix around the reactive particles.

11 Claims, 6 Drawing Sheets

(51) Int. Cl.
*B29C 70/04* (2006.01)
*B29C 70/06* (2006.01)
*B29C 70/10* (2006.01)
*C08G 69/08* (2006.01)
*C08G 69/20* (2006.01)
*B29C 44/02* (2006.01)
*B29C 70/48* (2006.01)
*B29K 67/00* (2006.01)
*B29K 105/00* (2006.01)
*B29K 105/12* (2006.01)
*B29K 309/08* (2006.01)

(52) U.S. Cl.
CPC .............. *B29C 70/10* (2013.01); *B29C 70/48* (2013.01); *C08G 69/08* (2013.01); *C08G 69/20* (2013.01); *B29K 2067/006* (2013.01); *B29K 2105/0002* (2013.01); *B29K 2105/12* (2013.01); *B29K 2309/08* (2013.01)

(56) References Cited

U.S. PATENT DOCUMENTS

| | | |
|---|---|---|
| 5,240,974 A | 8/1993 | Lechner et al. |
| 5,540,870 A | 7/1996 | Quigley |
| 5,622,210 A | 4/1997 | Crisman et al. |
| 6,007,656 A | 12/1999 | Heikkila et al. |
| 6,394,094 B1 | 5/2002 | McKenna et al. |
| 6,808,671 B2 | 10/2004 | Katayama et al. |
| 2001/0039972 A1 | 11/2001 | Badders et al. |
| 2008/0274322 A1 | 11/2008 | Kaps et al. |
| 2010/0173161 A1 | 7/2010 | Beehag et al. |
| 2010/0280239 A1 | 11/2010 | Shooshtari et al. |
| 2010/0305269 A1 | 12/2010 | Gleich et al. |

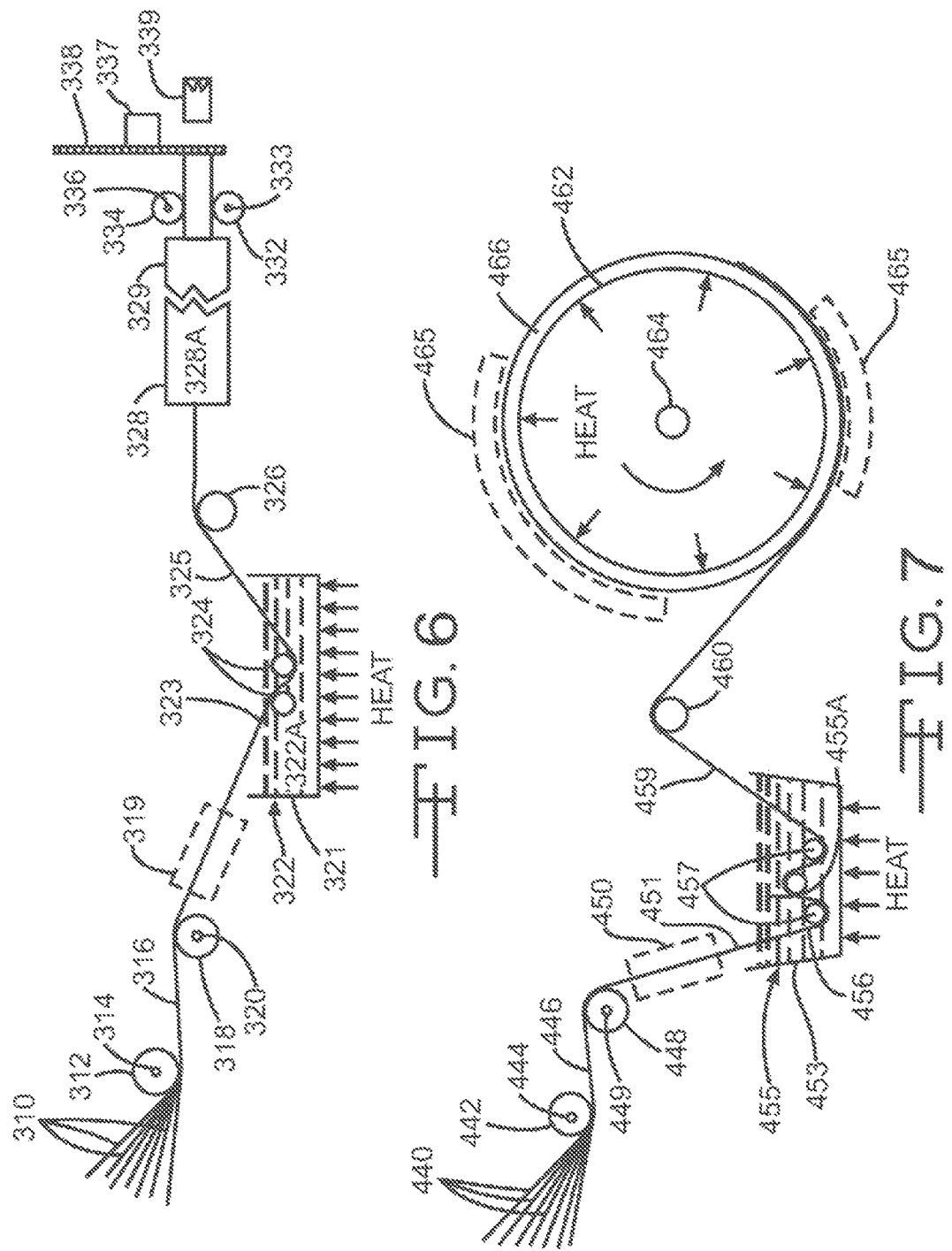

METHOD OF FORMING A MULTI-COMPONENT REINFORCED COMPOSITE

CROSS-REFERENCES TO RELATED APPLICATIONS

This application is a continuation of and claims priority to U.S. patent application Ser. No. 13/335,813, filed Dec. 22, 2011 now U.S. Pat. No. 9,169,351, and titled "Methods for Making Reinforced Thermoplastic Composites," the entire content of which is hereby incorporated by reference for all purposes.

Reactive sizing compositions for fibers and flakes are described that allow the fibers and flakes to participate in polymerization reactions with resin compositions to form fiber (and/or flake) reinforced composites. The composites may be used in a variety of applications, including building materials such as reinforced mats, tubing, and part components, among other applications.

BACKGROUND OF THE INVENTION

Forming processes are used to make large and/or structural glass fiber reinforced composite (GFRC) parts. Such processes include RIM (Reactive Injection Molding), SRIM (Structural Reactive Injection Molding), RTM (Resin Transfer Molding), VARTM (Vacuum Assisted Resin Transfer Molding), SMC (Sheet Molding Compound), BMC (Bulk Molding Compound), spray-up forming, filament winding, LFI (Long Fiber Injection molding) and pultrusion.

In the injection molding process, chopped glass fibers and pellets of a thermoplastic polymeric resin are fed into an extruder to mix the two together at elevated temperature. Substantial working and maceration is important and sometimes necessary to wet out the glass fibers at the elevated temperature due to the high viscosity, and as a result the glass fibers are shortened significantly. The resultant mixture is formed into a molding material that is supplied to a press or injection molding system to be formed with very expensive tooling into GFRC parts. During the extrusion process using single or twin-screw machines, the resin is heated and melted and the fibers are dispersed throughout the molten resin to form a fiber/resin mixture. Next, the fiber/resin mixture may be degassed, cooled, and formed into pellets or slugs. The dry fiber strand/resin dispersion pellets are then fed to a moulding machine and formed into moulded composite articles that have a substantially homogeneous dispersion of glass fiber strands throughout the composite article. Alternatively, in the process using continuous filaments, fiberglass filaments are mixed with the molten resin in an extruder with the screw geometry designed to mix the matrix with fibers without causing significant damage to the fibers. The resultant extruded mixtures are then compression molded to form long-fiber reinforced thermoplastic parts having superior mechanical properties due to the nature of the orientation and the longer length of the fibers. Because of these difficulties, the use of thermoplastics to make vehicle parts was limited.

With the newly proposed challenging CAFE gas mileage standards being introduced and growing needs for lighter weight parts in aircraft, there is a greater need for lighter weight parts that thermoplastic fiber reinforced composite (TPFRC) could satisfy. The thermoplastic polymers or copolymers can be recycled by melting and reclaiming, and ground thermoplastic TPFRC can be used in thermoplastic forming processes including injection molding, extrusion, etc. Thus, there is a large need for TPFRC parts using thermoset processes including RIM, SRIM, RTM, VARTM, reactive compounding, reactive injection molding including LFI, SMC, BMC, spray-up hand lay-up etc. if ways could be found to polymerize and form the thermoplastic polymers, copolymers and homopolymers in situ surrounding the fiber reinforcements in a mold.

Low viscosity caprolactam monomers, one containing an activator and another mixture containing a caprolactam monomer and a catalyst may be cast by mixing the two very low viscosity mixtures together prior to casting. However, this mixture often should be kept to less than about 100° C. to prevent rapid polymerization. Following casting, the cast mixture is heated in the mold to cause anionic poylmerization of the monomer to produce a polyamide. However, this method is not practical for most vehicle and large parts and many other current thermoset parts because of the relatively low temperature limitation and the time delays that are caused in the forming and polymerizing cycle. If TPFRC is to replace metals or thermoset fiber reinforced composites (TSFRC) substantially in the automotive industry and elsewhere, economical method(s) need to be found that will produce such automotive parts of equal or superior performance at competitive costs with metal and TSFRC parts now in use. This is achieved with the methods described herein.

BRIEF SUMMARY OF THE INVENTION

Processes used for making fiber and/or flake reinforced thermoset composites to be more easily used to make fiber reinforced and/or flake and/or particle stabilized and/or colored laminates comprised of thermoplastic cores or layers bonded to and/or surrounded by one or more thermoplastic layers and/or one or more thermoset layers, or for a thermoset core or layer(s) to be bonded to and/or surrounded by one or more thermoplastic layers and/or one or more thermoset layers are described. In all such variations, at least one of the layers may contain one or more of reactive fibers and/or reactive flakes and/or reactive particles. Reactive fibers/flakes/particles may include fibers/flakes/particles that have a residue on their surfaces that comprise one or more of a polymerization initiator (PI), a precursor of a PI, a polymerization catalyst, or a precursor of such a catalyst. The residue on the surfaces of the fibers, flakes and particles may be produced by coating the fibers, flakes and particles with a liquid sizing composition and then, when desired, drying the fibers, flakes and particles to remove the liquid.

Present embodiments include methods of forming a multi-component reinforced composite. The methods may include forming a first particle-reinforced component. The first particle-reinforced component may be formed by a process that includes providing reactive particles that have a reactive polymerization promoter chemically bonded or coated on the surface of the reactive particles and contacting the reactive particles with a resin solution that includes monomers of a polymer. The polymerization promoter that is chemically bonded or coated on the surface of the reactive particles may promote the polymerization of the monomers. The resin solution may subsequently be polymerized forming a polymer matrix around the reactive particles resulting in the formation of the first particle-reinforced component. A second polymer-containing component may then be formed that is in contact with the first particle-reinforced component.

An alternative method of making a multi-component reinforced composite includes forming a first polymer-containing component and forming a second particle-reinforced component that is in contact with the first polymer-containing component. The second particle-reinforced component may be formed by a process that includes providing reactive particles that have a reactive polymerization promoter chemically bonded or coated on the surface of the reactive particles and contacting the reactive particles with a resin solution that includes monomers of a polymer. The polymerization promoter that is chemically bonded or coated on the surface of the reactive particles may promote the polymerization of the monomers. The mixture of the reactive particles and the resin solution may then be introduced to the first polymer-containing component. The resin solution may subsequently be polymerized forming a polymer matrix around the reactive particles resulting in the formation of the second particle-reinforced component in contact with the first polymer-containing component.

The present methods include making a reinforced and/or stabilized and/or colored laminate containing at least two layers, one of the layers containing one or more of reactive fibers, reactive flakes and reactive particles in composite parts and products. Reactive thermoplastic and thermoset materials may be used in reactive extrusion and/or reactive injection molding processes. The processes include resin transfer molding (RTM), reactive injection molding, injection pultrusion, and the use of other systems that have and use a two-pot melting and injection system. Additionally, a process may include the use of only one pot, except in instances where a two or more layered composite product is desired. Existing two pot systems may be used to make two-layer or multi-layer reinforced or unreinforced polymer laminates to improve structural, aesthetic, and surface properties. The present methods also permit the use of only one pot on two pot systems, permit the manufacture of two pot systems to be simplified and cost reduced by including only one pot and substantially simplifies the above mentioned processes of forming reinforced polymer parts and products.

The present methods allow for the production, in these or slightly modified forming systems, of laminates in which a strong, rigid, reinforced or unreinforced, stabilized and/or unstabilized and/or colored or not colored, thermoset or am elastomeric thermoplastic polymer layer, core layer or core can be protected by one or more layers of, sandwiched between two layers of, or surrounded by a layer of, tough, elastomeric reinforced or unreinforced, stabilized and/or un-stabilized and/or colored or not colored elastomeric thermoplastic polymer, or a hard, rigid reinforced or unreinforced, stabilized and/or un-stabilized and/or colored or not colored thermoset polymer.

The present methods may include the use of polymer initiator(s) PI(s) and/or catalysts on the surfaces of the reinforcing fibers and flakes, and/or particles of fillers and/or pigments made reactive with the PI(s) and/or catalysts initiating polymerization of monomer(s) to produce polyamides, polyesters, polyurethanes and other polymers including thermoplastic polymers whose monomers may be included in the pre-polymerized mixture include polybutylene terephthlalate (PBT), polyethylene terephthalate (PET), polyamide-6 (PA-6), polyamide-12 (PA-12), polyamide-6,6 (PA-6,6), cyclic poly(1,4-butylene terephthalate) (CBT), polyurethanes (TPU), polymethylmethacrylate (PMMA), polycarbonates (PC), polyphenylenesulphide (PPS), polyethylenenapthalate (PEN), polybutylenenaphthalate (PBN), polyether etherketone (PEEK), and polyetherketoneketone (PEKK), and combinations of two or more of these polymers, among other polymers commonly used. When polymerizing a PBT system the reactive fibers and/or flakes do not have a PI on their surfaces, only one or more catalysts for polymerization of PBT are on their surfaces. Not having to mix a catalyst with the PBT before forming is a valuable improvement due to the tendency for the PBT to polymerize prematurely in present systems and processes.

The PI(s) can be coupled or non-coupled. The PI(s) for polyamide may be isocyanate-based or non-isocyanate-based. PBT to polyester systems may not use a PI, and only a catalyst may be necessary on the surfaces of the fibers and flakes to polymerize the cyclic poly(1,4-butylene terephthalate) (CBT) monomer to cyclic PBT. Suitable catalysts include tin-containing compounds and/or titanium-containing compounds. For example the catalysts may include organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) trisalkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra(2-ethylhexyl) titanate), among others.

For polyurethane, epoxy or other blocked isocyanates including blocking agents such as oximes such as methyl ethyl ketoxime, acetone oxime, and cyclohexanone oxime, lactams such as epsilon-caprolactam, and pyrazoles may be used as PIs. Precursors thereof and isocyanates including blocked trimethylene diisocyanate, blocked tetramethylene diisocyanate, blocked hexamethylene diisocyanate, blocked butylidene diisocyanate, blocked isophorone diisocyanate, blocked methyldiphenyl diisocyanate, blocked toluene diisocyanate, blocked 1,4-cyclohexane diisocyanate, blocked hexamethylene diisocyanurate, blocked hexamethylene diisocyanate biuret and combinations thereof may also be used. The blocked-isocyanate PIs or the precursors thereof may also comprise a silane end-group for coupling to the glass surface.

Reactive materials including fibers and/or flakes and/or filler particles and/or pigment particles may be used with thermosetting materials. The reactive materials described above may have one or more materials on their surfaces that may, at the appropriate temperatures cause the thermosetting materials to polymerize to form reinforced thermoset composites.

Present embodiments include the use of reactive reinforcing fibers and/or flakes and/or particles of fillers and or particles of pigments sized with sizing compositions, the dried residue thereof, on their surfaces. Present embodiments also include fiber reinforcements including glass fibers or flakes and particles of fillers and pigments sized using sizing compositions containing one or more PI(s), precursors thereof or catalyst(s) for causing polymerization of various monomers to form polymers including polyamide 6, polyester (PBT), polyurethanes and other polymers to size reinforcing fibers or flakes to produce reactive reinforcing fibers and flakes. When a heated monomer comes into contact with the reactive reinforcing fibers and/or flakes, containing one or more catalyst(s) or one or more PI(s), or precursor(s) thereof, polymerization begins and proceeds to form the polymer. With the present embodiments it may not be necessary to put one or more PI(s) or one or more catalyst(s) in separate monomer (i.e. two separate pots) to produce composite parts in the above described processes. This may be accomplished by placing one or more polymerization (PIs), or one or more precursors of such PI(s) onto the reinforcing fibers and/or flakes as one, or two separate coatings, and combining low viscosity thermoplastic monomers including caprolactam, polybutelene terathylate (PBT) and others, and optionally using mixtures of such monomer(s) containing one or more catalysts, including butylchlorotin dihydroxide, tetraisopropyl titanate, tetramethylammonium tetraphhenyl borate, compounds containing tertiary amines or quarternary ammonium salts, and organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) tris-alkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra(2-ethylhexyl) titanate), among others for PBT. Compounds represented as Y—(X)$_n$-A, where Y is either a coupling moiety for bonding with the surfaces of the fibers and/or flakes, e.g. glass, A is ring-opening polymerization catalyst or initiator moiety capable of participating in a ring-opening polymerization of a monomer when exposed to ring-opening polymerization conditions, and X is a linking moiety capable of linking the Y moiety to the A moiety chemically. The n is an integer ranging from zero to 3. When n is zero, the catalyzing moiety itself may be capable of coupling with the reinforcement surface. In additional embodiments, Y could also be replaced with A, in which case it is not necessarily coupled to the reinforcement surface. Examples of initiators for polymerizing polyamides include N-hexamethyldiisocyanato-capped caprolactam, N-acetylcaprolactam, Isophthaloylbiscaprolactam, Isocyanatopropyltriethoxysilane-capped caprolactam and others including caprolactam esters such as benzoyl caprolactam, reaction products of acryloyl/methacrylol caprolactam with amino/mercapto silanes or non-silane amines/thiols, compounds/reaction schemes depicted by

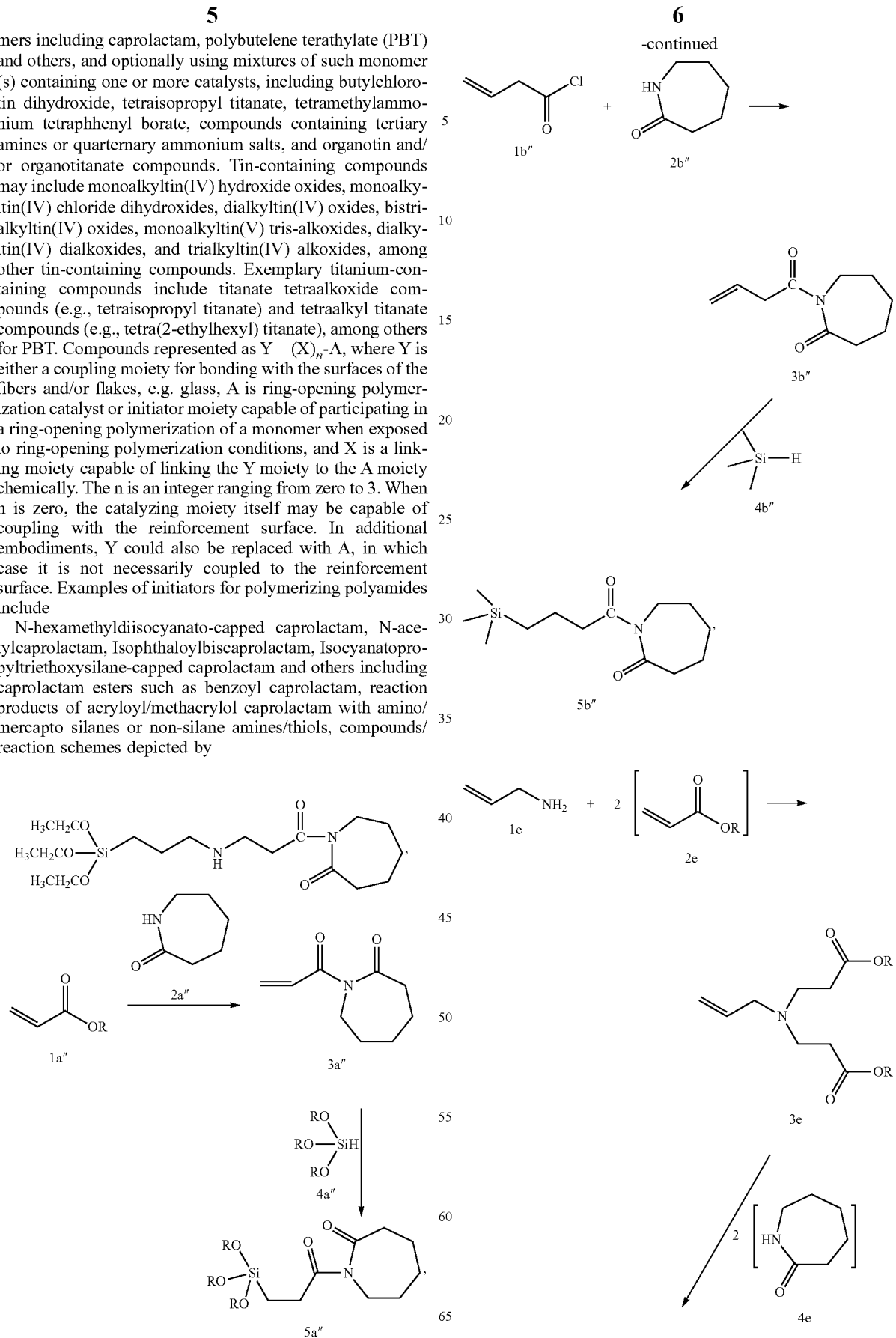

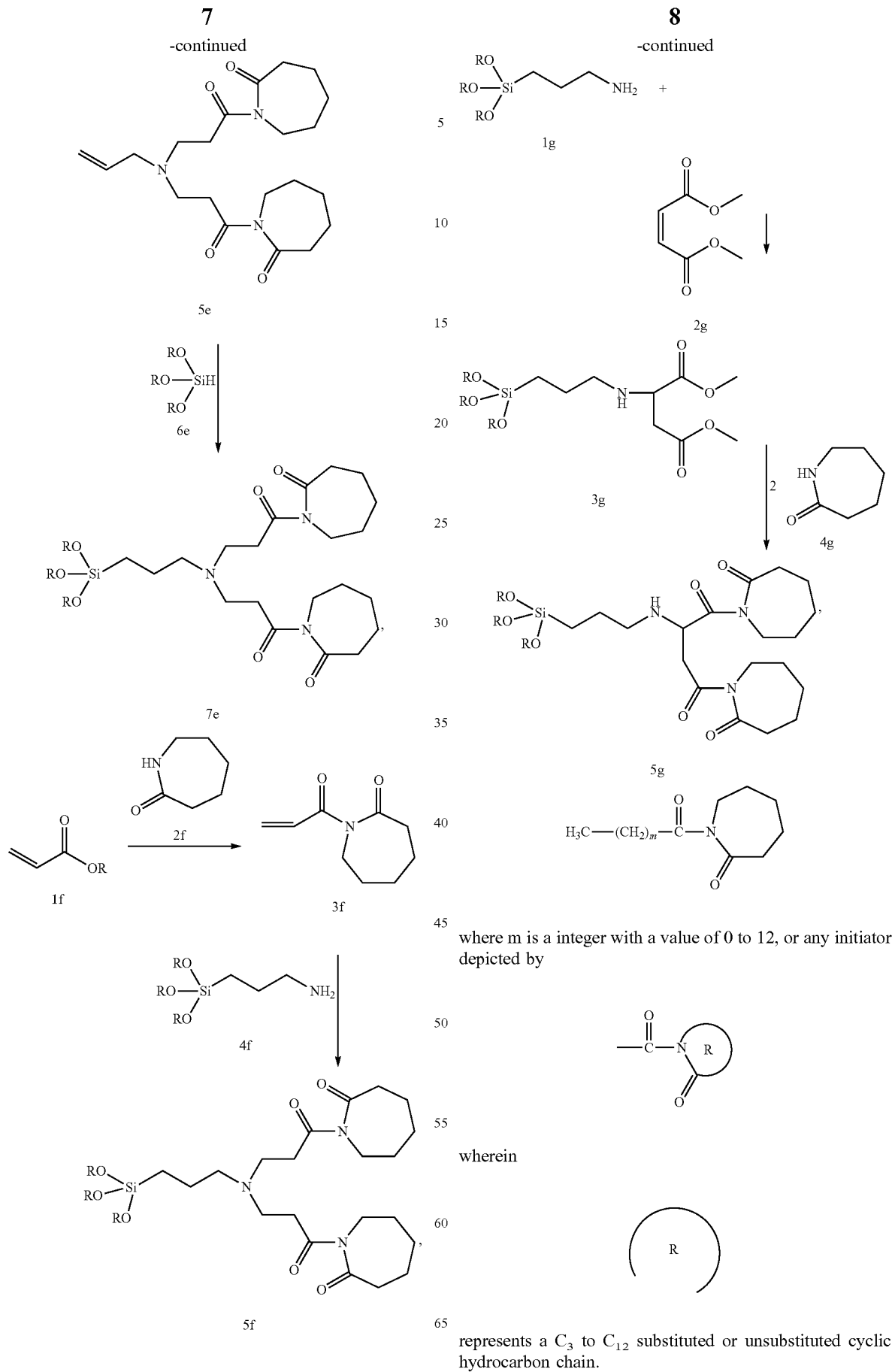
where m is a integer with a value of 0 to 12, or any initiator depicted by
wherein
represents a $C_3$ to $C_{12}$ substituted or unsubstituted cyclic hydrocarbon chain.

Cyclized PBT oligomer is converted to linear PBT in the range of about 180° C. to about 200° C. in the presence of a catalyst. The elevated temperatures for polymerization of the caprolactam monomers can be optionally in the range of about 110° C. for a few minutes, up to about 5-10 minutes to complete or complete sufficiently the reaction(s) to form the activator in situ, before raising the temperature to the following higher levels. In alternative embodiments, the temperature may initially be about 140° C. to about 200° C., about 150° C. to about 180° C., or about 150° C. to about 170° C., to cause the anionic polymerization of at least about 90 percent (for example, more than 97 percent) of the monomer(s) resulting in a similar percentage of polycrystalline polyamide or other polymer.

Present embodiments of the methods include making reinforced thermoset composites such as laminates of all types including unsaturated polyesters, vinyl esters and acrylates that cure via free radical polymerization as one or more layers of the laminates. Reactive sizing on the surfaces of the reinforcing fibers and/or flakes may comprise either one or more catalysts or one or more PI(s) physically or chemically bonded to the surfaces. The catalysts may include metal salts, amines, thiols, acids and combinations thereof. Free radical PI(s) include hydroperoxides.

Embodiments may include having one or more PI(s) present on the surfaces of the reinforcement fibers and/or flakes. Exemplary fibers and/or flakes include glass, such as E glass, however a broad range of materials suitable for the reinforcement fibers and/or flakes may be used. In some of the embodiments one or more catalysts may also be present in the sizing composition and on the surfaces of the reinforcing fibers and/or flakes. The present sizing compositions may include a liquid and either one or more PI(s) or one or more precursors of such one or more PI(s) either in a single coating or in two or more coatings. The present sizing compositions may also be used in methods of making reactive reinforcements.

The present methods simplify the RTM, RIM, VARTM/RIM, (vacuum assisted RTM or RIM), pultrusion, injection molding and filament winding systems and processes by placing the PA and/or catalyst on the surface of the reinforcement fibers and/or flakes. For example, the cost and added complexity of the equipment needed, such as additional resin tanks, heaters, pumps, lines, valves, mixers, etc., and the elimination of such equipment means that the maintenance costs including cleaning and mixing, are substantially reduced. Where the complex systems currently exist, the present embodiments free up one or more monomer or monomer mixture portion of the system to permit the molding system to make laminate or over-molded parts and/or products by using the first shot to make a Nylon 6 or PBT core or layer and then at the appropriate time, having used the other monomer or monomer mixture equipment to make a second shot of polyurethane or PBT to produce a outer surface or second layer having enhanced properties including one or more of moisture absorption, smoothness, hardness level, etc. In other embodiments, a strong thermoset core can be over-molded with a more impact resistant, tougher thermoplastic shell.

Optionally, all of the fiber and/or flake, and the reactive filler(s) and/or pigment(s) and the monomer or monomer mixture may be preheated to or near the desired polymerization temperature. When molds are involved the molds may also be preheated at least above the melting point of the monomer when the monomer is solid at room temperature. After forming, the composite, in or out of the mold, may be placed in a hot environment to complete the polymerization to the desired degree. The total polymerization time will depend upon the temperature and degree of polymerization. For example, the polymerization reaction may take about 5 to about 15 minutes which may or may not include the up to about 10 minutes if the one or more polymerization activators are formed in situ on the fibers in the initial stage of impregnating the reinforcing fibers with the one or more monomers. In the latter case, if more time is needed to complete polymerization at the higher temperatures, another few minutes up to about 10 minutes may be taken because during this amount of time the reinforcements and mold temperature will be held at about 120° C. to first form the activator(s) before raising the temperature to the higher, polymerization temperatures.

Present embodiments also include methods of making reinforced polyamide 6 and/or PBT molding slugs or pellets for molding, and reinforced polyamide 6 and/or PBT composite parts in processes including RIM, VARIM, SRIM, pultrusion, filament winding and high pressure injection molding. In these methods two separate melting vessels may be used with one melting vessel melting a mixture of lactam monomer and one or more catalysts at 80° C.-160° C. and the other melting vessel melting a mixture of cyclic poly(1,4 butylene terephthalate monomer and one or more catalysts at 150° C.-160° C. These two melts may then be directed in separate pipes into mixing head where they are mixed thoroughly and then directed in a one or more pipes to a heated mold, the mold containing a fibrous preform, previously made from chopped fibers, rovings, nonwoven mat(s) or woven fabric(s). To reduce molding time, the preforms may be preheated to a temperature in the range of about 100° C. to about 220° C. before placing the preform into the heated mold. The mixed monomer, PI(s) and catalyst(s) impregnate the fibrous preform surrounding the fibers and polymerize due to the heat of the mold and preform at about 160° C.-180° C. for polyamide 6 and 170° C.-210° C. for PBT, forming fiber reinforced polymide 6 composite. The amount of reinforcing fiber in these composites may be in the range of about 30 to about 80 wt. percent.

Some embodiments include methods that are a variation of the just described methods. The variation involves first sizing or coating the fibers with a sizing composition that includes one or more PI(s) for the caprolactam and PBT and then either chopping and drying the fibers or winding and drying the fibers before they are used to make the fibrous performs. The sizing compositions may be solvent based and may use solvents such as water as the liquid carrier, and may also contain one or more catalysts for the polymerization of caprolactam and/or PBT plus optionally other fiber sizing ingredients. For example, the sizing compositions may optionally contain one or more organo-silane coupling agents, optionally one or more lubricants to protect the fiber surface from scratching, gouging, etc. and can optionally contain one or more film formers for coating the fiber and bonding the other non-water ingredients to the surfaces of the fibers. The size may also contain enough PI to polymerize the mixture of monomer and catalyst that may be forced into the heated mold and heated fibrous perform. In this alternative method of making fiber reinforced polyamide 6 composites, only one melting vessel may be used to melt the mixture of caprolactam and the one or more catalysts and this melted mixture may either go straight to the mold, or optionally may pass through a mixing head for better homogeneity.

As an alternative to the embodiments described just above, further embodiments include a sizing that contains a silane chemically bonded to a one or more PI(s) instead of the PI(s) and the optional organo-silane coupling agent being separate compounds. In these embodiments, the silane is chemically bonded to the fibers, particularly to fibers containing silica or a compound containing silica, and the PI will become bonded, for example, chemically bonded, to the polymer matrix providing for greater interfacial strength between the reinforcing fibers and the polymide 6 and/or PBT polymer matrix.

Further embodiments include a sizing that contains one or more precursors for the PI(s) and/or the catalyst(s). Where more than one precursor is used, one or more precursors may be present in the size composition, or one or more precursors may be present in a first size composition and the other precursor(s) may be present in a second size composition applied after the first size composition is applied with or without a drying step between the sizing applications. These sizes may also be applied to fibrous webs in the wet, nonwoven mat forming processes and the and dry, nonwoven mat forming processes disclosed earlier, and also to the woven fabric, all followed by drying.

An additional method of applying the sizing containing the polymerization initiator(s) to the reinforcing fibers includes a secondary fiber and/or flake, filler and pigment coating application. This secondary coating application may be prior to the fibers being chopped or wound, after the fibers are dried followed by another drying step, or when the fibers are used to make a nonwoven mat, nonwoven or woven scrim or woven fabric, the sizing may be impregnated into the mat, scrim or fabric or onto the flakes by spraying or passing a excess of sizing onto the mat, scrim or fabric with the excess passing through the mat, scrim or fabric to be collected and reused. In the case where the nonwoven mat is made by a wet process, the sizing can be applied, alone or in a binder mixture, to the wet web, of fibers before drying the sized mat, and curing the binder if present. Where the mat is formed by a dry process the initiator sizing can be applied to the dry web, alone or in a binder mixture, followed by drying the mat, and curing the binder, if present.

Where the fiber preforms are made to shape by a wet process, the sizing containing the PI(s) may be in the water of the slurry, or may be sprayed onto the perform in excess after the wet perform has been formed and the excess sucked through the perform as in the mat, scrim and fabric application. Where the perform is made by hand lay-up or spray-up, the sizing containing the PI(s) with or without a binder, may be sprayed onto the collected chopped fibers, strands or rovings as the thickness of the perform is being built up.

Flakes, usually glass flakes, when used in the present embodiments may be prepared by spraying the size composition onto the flakes while the flakes are stirred in a mixer that does not significantly degrade the flakes, to disperse the size over the surfaces of the flakes followed by drying the sized flakes. This process may be repeated with a different sizing containing a catalyst or a precursor of either the PI(s) or the catalyst producing dry flakes having two layers of sizing coating the flakes. The reinforcing fibers used for making reinforced composites may include glass fibers, any of the glass types used for reinforcing polymers, and E glass. The reinforcing fibers need not be glass, nor do all of the fibers need to be glass. Other reinforcing fibers useful in place of all, or a portion of the glass fibers include, slag fibers, carbon fibers, ceramic fibers, alumina fibers, silica fibers, rock fibers including basalt fibers, asbestos, wollastinite fibers, fibrous talc, metal fibers and polymer fibers including fibers of aramid, polyester and polyethylene. Additionally, any combination of these fibers may be used.

Reactive fillers and/or pigments may also be used in place of or in addition to the reactive fibers and/or flakes, and with non-reactive fibers and/or non-reactive flakes. The fibers, flakes, filler particles and pigment particles may be of any material used to reinforce, stabilize and/or color and/or to texture thermoplastic and thermoset composite parts or products.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 6 is a simplified schematic drawing of a modified pultrusion system according to embodiments of the invention.

FIG. 7 is a simplified schematic drawing of a modified filament winding system according to embodiments of the invention.

DETAILED DESCRIPTION OF THE INVENTION

Figure 1:
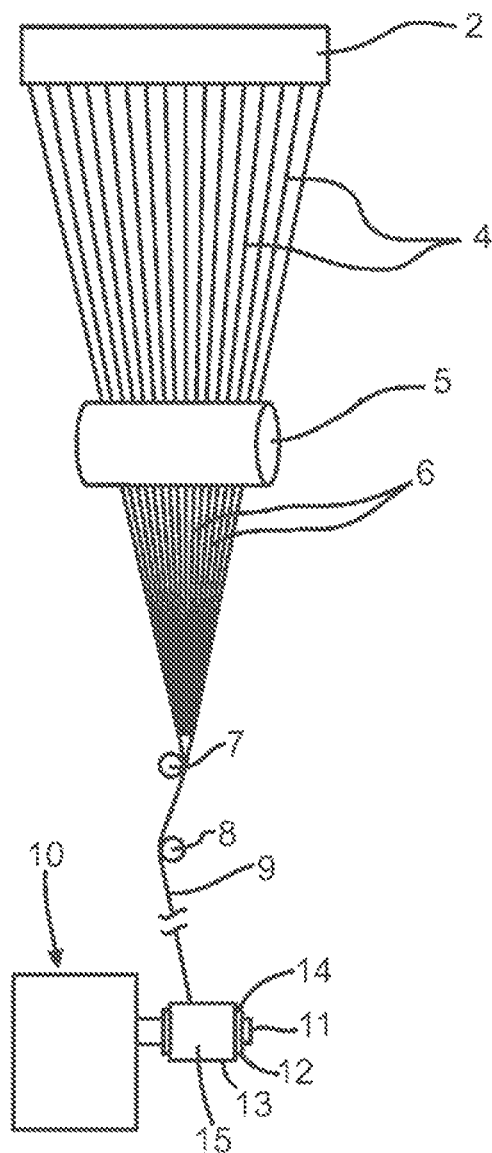
FIG. 1 is a simplified schematic drawing of a continuous glass fiber manufacturing system for making wound, reinforcing fiber products according to embodiments of the invention.

Present methods may use PI(s) such as caprolactam, polybutelene terathylate (PBT) and others, and may optionally use mixtures of such monomer(s) containing one or more catalysts, including butylchlorotin dihydroxide, tetraisopropyl titanate, tetramethylammonium tetraphhenyl borate, compounds containing tertiary amines or quarternary ammonium salts, and organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) tris-alkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra (2-ethylhexyl) titanate), among others. Compounds represented as $Y-(X)_n-A$, where Y is either a coupling moiety for bonding with the surfaces of the fibers and/or flakes, e.g. glass, A represents ring-opening polymerization catalyst or a PI(s) moiety capable of participating in a ring-opening polymerization of a monomer when exposed to ring-opening polymerization conditions, and X is a linking moiety capable of linking the Y moiety to the A moiety chemically. The n is an integer ranging from zero to 3. When n is zero, then the catalyzing moiety itself is capable of coupling with the reinforcement surface. In another version of this compound, Y could also be replaced with A, in which case it is not necessarily coupled to the reinforcement surface. Examples of PI(s) for polymerizing polyamides include N-hexamethyldiisocyanato-capped caprolactam, N-acetyl-caprolactam, Isophthaloylbiscaprolactam, Isocyanatopropyltriethoxysilane-capped caprolactam and others including N-acyllactams, caprolactam esters and lactam-blocked isocyanates present in a range of about 0.5 to about 5 wt. percent of the monomer. Using these polymerizing caprolactam systems results in fast polymerization reaction kinetics, clean polymerization without any by products and a crystalline polyamide 6 polymer.

Cross-linking and branching issues in the polymerization of Nylon 6, polyamide 6, may be avoided by the use of non-isocyanate polymerization initiators such as acyl-lactams in combination with a Grignard salt of caprolactam as a catalyst. Using such a system results in a rapid polymerization reaction kinetics, clean polymerization without any by products and a crystalline polyamide 6 polymer. An example of such a system is the use of N-acetyl caprolactam as the initiator Grignard salt of lactam may be useful as a catalyst. A Grignard salt of a lactam may be safely made in one reaction operation by reacting a metal Mg with an alkyl halide or an aryl halide and a lactam. A lactam shown by the formula I (R is 3-11C aliphatic hydrocarbon residue) is reacted with metal Mg and an alkyl halide or an aryl halide at −15-120° C., to give a compound shown by the formula II (n is 3-11; Y is Cl, Br, or I). Metal Mg having a small amount of oxidized film on the surface and >/=90% purity may be used as the metal Mg, and it may be in the form of a flake, powder, etc. having large specific surface area. A monohalogenated hydrocarbon may be used as the halogenated hydrocarbon, and the amount used may be 1.0-1.5 mol based on 1 mol metal Mg. An amount of the lactam used may be 0.9-5 mol based on 1 mol metal Mg.

Chemical sizings applied to the surfaces of the fibers, including glass fibers and/or glass flakes and other fibers containing silica and/or alumina, may contain a lubricant, a film former and a silane coupling compound. The lubricant protects the surface of the fibers, which is essential to maximize the strength of the fibers and protect the fibers from scratches, etc. caused by fiber-to-fiber rubbing abrasion and processing equipment. The silane acts as the chemical linking agent by bonding to the glass fiber and also to the polymer/copolymer matrix. Silanes containing organosilane groups may be used as coupling agents for glass fibers and organic (e.g. polymer) phase, and serve to covalently bond the organic groups in the compound to groups on the inorganic surfaces. The film former provides the desired degree of bond between the fibers in the fiber strands to avoid fuzzing and excess filamentation during processing in the fiber manufacturers operations and/or in the composite manufacturers' operations. The sizing may also contain one or more ring-opening or PBT polymerization catalysts compounds, or one or more precursors thereof, and, in some embodiments, a linking compound capable of linking the silane compound and the PI/catalyst compound(s) or precursor(s) together and to the surfaces of the reinforcement(s). Examples of linking compounds may include compounds containing a covalent bond, an alkyl group, an aryl group, an alkene group, an amine group, or a thiol group among other linking moieties that may cause polymerization of the hot monomer mixture to form a polymer matrix around and bonded to the reinforcing glass fibers. Sizings may be applied to flakes by spraying onto the flakes in a fluid bed or mixer followed by drying.

The chemical sizing compositions include a liquid carrier such as water, and either one or more PI(s) or one or more precursors of one or more PI(s) and may also optionally contain one or more other functional ingredients. The sizing may contain one or more silane coupling agents, one or more lubricants to protect the surfaces of the fibers from damage, and one or more surfactants or wetting agents, etc. and may also optionally contain one or more resinous film formers for bonding the other ingredients to the fibers and also to provide a bond of desired strength between the many fibers in a strand formed by a plurality of fibers from the bushing 2.

The present embodiments may be applicable to a broad range of sizing compositions so long as each contains at least one PI or one catalyst for polymerization of either PBT or of polyamide 6 or at least one precursor for the at least one such PI or catalyst.

The sizing may include one or more coupling agents for chemically bonding the fiber to the polymer matrix chemically. Suitable coupling agents include aminosilanes, the reaction product of an aminosilane, maleic anhydride, ureidosilanes, vinylsilanes, and blends thereof. An exemplary silane is A1100, available from OSI Specialties. This product contains 52% by weight active silane solids following hydrolysis. Another exemplary silane that may be used is a hydrolyzed A1100 solution in water, also available from OSI Specialties under the designation VS142 (40% solution) or from Huils under the designation A1151 (40% solution). In an embodiment where one or more of the PI(s) or precursors are silanes, the majority of the coupling between the organic molecules and glass is effected by the PI(s) or the precursors. Additional coupling silanes may also be used.

The size compositions may contain one or more surface modifying or coupling agents selected from functional organo silane, organo titanate and organo zirconate coupling agents. The amount of functional organo-silane coupling agent may be about 1 to about 30 wt. percent, about 4 to about 20 wt. percent, or about 6 to about 12 wt. percent of the forming size composition on a total solids basis.

The size compositions may contain one or more lubricants, to protect the surfaces of the fibers and flakes and to aid manufacturing reducing friction where the wet fibers slide past, on or over guides and other physical objects. A small amount, usually no more than about 0.15 weight percent of the size composition of a lubricant compatible with the liquid in the sizing may be used. Suitable lubricants for this purpose include one or more of the following: a nonionic surfactant such as a block copolymer of ethylene oxide and propylene oxide, e.g. LUVISKOL K grade and PLURONIC L101 (available from BASF of Florham Park, N.J.) or SYNPERONIC PE/IL101 (available from AkzoNobel of Morris, Ill.), polyethyleneimine polyamide salt, such as EMERY 6760 (available from Henkel Corp. of Rocky Hill, Conn.); octylphenoxypolyethoxyethanol such as TRITON X100 (available from Rohm and Haas of Philadelphia, Pa.); a polyvinyl pyrrolidone, e.g., an imidazoline, e.g., an alkylimidazoline derivative such as TEGO cationic softener (available from Th.Goldschmidt AG of Essen, Germany), amine salts of fatty acids, e.g., including a fatty acid moiety having 12 to 22 carbon atoms and/or tertiary amines having alkyl groups of 1 to 22 atoms attached to the nitrogen atom), alkyl imidazoline derivatives (can be formed by the reaction of fatty acids with polyalkylene polyamines), acid solubilized fatty acid amides (e.g., saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY 6717, a partially amidated polyethylene imine commercially available from Henkel Corporation of Kankakee, Ill. and ALUBRASPIN 226, available from PPG Industries, Inc. of Pittsburgh, Pa., alkyl imidazoline derivatives including CATION X, available from Goldschmidt Chemical Corporation (see above), and ALUBRASPIN 261, available from PPG Industries, Inc. (see above), and cationic lubricants such as silylated polyamine polymers prepared by reacting: (a) an amino functional reaction product of an aminofunctional polymer having primary or secondary amine functionality and the residue of a fatty acid moiety; and (b) an amine-reactable organo alkoxy silane and hydrolysis products thereof. Other lubricants include Emerset 2646 and Emerset 2661, available from Emery Industries of Waterloo, Iowa. When one or more lubricants are used in the sizing compositions the total amount of the one or more lubricants in the size composition may be about 0.1 to about 10 weight percent, about 0.5 to about 5 weight percent, or about 1 to about 3 weight percent of the forming size composition on a total solids basis.

The size compositions may optionally include a film former for physically bonding the PI(s), PI precursor(s), catalyst(s) or catalyst precursor(s) to the fibers and flakes. Many film formers may be used including FULATEX PD-0166 and FULATEX PN-6019, both available from Fuller. FULATEX PN-6019 is a modified vinyl acetate copolymer in an anionic/nonionic surfactant system having a solids content of 53.5 to 55.5 weight percent; a pH of 3.5 to 4.5; VINAMUL™ 88127 or N.S. 25-1971 available from National Starch of Bridgewater, N.J. is a copolymer containing from about 53.5 to 55.5 weight percent solids, and having a pH of 4 to 5; FULATEX PD-0166 and FULATEX PN-6019, which are both available from the H. B. Fuller Company of St. Paul, Minn. FULATEX PN-6019 is a modified vinyl acetate copolymer in an anionic/nonionic surfactant system with the following properties: solids content of 53.5 to 55.5 weight %, viscosity of 100 to 600 cps, pH of 3.5 to 4.5, and a residual monomer content of 0.5% or below. Another film former that may be used is VINAMUL™ 88127 which is available from Vinamul U.K. or from National Starch under the product code N.S. 25-1971. This copolymer may contain from 53.5 to 55.5% by weight solids, has a pH of 4 to 5, and a viscosity of from 100 to 400 mPa·s. The film-forming material may also be one or more N-vinyl amide polymers prepared from a cyclic monomer, for example N-vinyl-2-pyrrolidone, N-vinyl-2-piperidone, N-vinyl-.epsilon.-caprolactam, N-vinyl-5-methyl-2-pyrrolidone, N-vinyl-3,3,5-trimethyl-2-pyrrolidone, N-vinyl-3-methyl-2-pyrrolidone, isomers, derivatives and mixtures thereof. Epoxy film formers such as Neoxil™965, available from DSM Composite Resins AG of Schaffhausen, Switzerland are suitable as are polyurethane-based film formers including Hydrosize™ U1-01/U6-01 available from Hydrosize Technologies, Inc. of Raleigh, N.C. When one or more film formers are present in the size compositions the total amount of film former present may be about 0.5 to about 15 wt. percent, about 1 to about 10 wt. percent, or about 1 to about 5 wt. percent of the forming size composition on a total solids basis.

The size compositions may also optionally contain one or more of emulsifying agents, surfactants, plasticizers, film former modifiers, biocides and other size composition functional aids. The size may also include a pH adjusting agent, such as an acid or a base, in an amount sufficient to achieve a desired pH, for example, a pH of about 6 to about 8.5. Exemplary acids include acetic, citric, sulfuric, phosphoric and similar acids. Exemplary bases include ammonium hydroxide and potassium hydroxide. Each size composition may be applied to the fibers and flakes and then dried with the dried solids of the size being present on the fibers and flakes in an amount in the range of about 0.1 to about 5 wt. percent, based on the weight of the dry fibers and flakes. Additional ranges may include about 0.5 wt. percent to about 3 wt. percent and about 1 wt. percent to about 2 wt. percent, measured by a loss on ignition (LOI) test of the fiber or flake products.

When one or more PI(s) are present in the sizing composition the amount of total PI solids in the sizing may be in the range of about 2 wt. percent, dry basis, to about 30 wt. percent. Exemplary ranges may include about 5 wt. percent to about 20 wt. and about 8 wt. percent to about 16 wt. percent. When one or more catalysts are present in the sizing, the amount may be in the range of about 2 wt. percent to about 20 wt. percent, dry basis. Exemplary ranges include about 5 wt. percent to about 15 wt. percent and about 8 wt. percent to about 12 wt. percent. As a further guide, below are a few of many possible sizing compositions.

Size Composition #1:

| Ingredient | Weight % |
| --- | --- |
| Caprolactam silane[a] | 12 |
| Film former[b] | 1.2 |
| Lubricant[c] | 1.1 |
| Acetic Acid | 0.03 |

-continued

| Ingredient | Weight % |
|---|---|
| Ammonium Hydroxide | 0.04 |
| Deinoized water | 85.63 |

[a]Choice of silanes such as reaction product of acryloyl caprolactam + aminopropyltriethoxysilane or acryloyl caprolactam + mercaptopropyltrimethoxysilane or methacryloyl caprolactam + amino/mercaptosilane or any other trialkoxysilane containing end group specified by

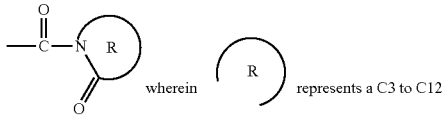 wherein represents a C3 to C12 substituted or unsubstituted cyclic hydrocarbon chain.

[b]Choice of film formers such as Neoxil 965, Hydroside U-101/201/601 or any other Epoxy or PU-based film formers
[c]Combination of one or more lubricants from Emerest 2646, Emerest 2661 and Emery 6717.

Procedure—
1. Add film former to ⅔ of deinoized water and stir in a mixing tank
2. Add caprolactam silane and continue stirring
3. Add acetic acid as necessary and continue stirring for an adequate period of time to ensure hydrolysis of silane (30 minutes-4 hours)
4. Add lubricants and mix for 5 minutes
5. Add rest of the DI water
6. Add ammonium hydroxide as necessary to ensure that the target pH (7-8.5) is achieved without affecting the sizing stability
7. Record solids % and pH Size Composition #2

| Ingredient | Weight % |
|---|---|
| Initiator for AP Nylon[1] | 11 |
| Caprolactam silane[a] | 1 |
| Film former[b] | 4 |
| Lubricant[c] | 2 |
| Acetic Acid | 0.01 |
| Ammonium Hydroxide | 0.01 |
| Deinoized water | 81.98 |

[1]Choice of initiators from acetyl caprolactam, isophthaloylbiscaprolactam, acryloyl caprolactam, methacryoyl caprolactam, benzoyl caprolactam, or any other initiator containing the end group specified by

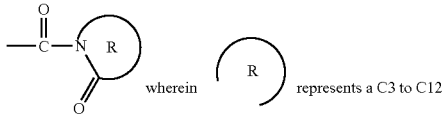 wherein represents a C3 to C12 substituted or unsubstituted cyclic hydrocarbon chain.

[a]Choice of silanes such as reaction product of acryloyl caprolactam + aminopropyltriethoxysilane or acryloyl caprolactam + mercaptopropyltrimethoxysilane or methacryloyl caprolactam + amino/mercaptosilane or any other trialkoxysilane containing end group specified by

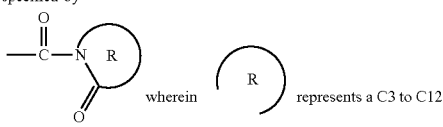 wherein represents a C3 to C12 substituted or unsubstituted cyclic hydrocarbon chain.

[b]Choice of film formers such as Neoxil 965, Hydroside U-101/201/601 or any other Epoxy or PU-based film formers
[c]Combination of one or more lubricants from Emerest 2646, Emerest 2661 and Emery 6717.

Procedure—Similar procedure as Example 1 may be followed for liquid initiators wherein the initiator is added along with caprolactam silane. For solid initiators, the film former and water mixture is heated to 90° C. and the initiator is melted first before adding to the film former-water mixture. The contents are mixed well to ensure the formation of a stable dispersion of the initiator in water. The silane is then added and the rest of the procedure is followed as per Example 1.

Size Composition #3:

| Ingredient | Weight % |
|---|---|
| Precursor for initiator for AP Nylon[2] | 8 |
| Aminopropyltriethoxysilane* | 1 |
| Film former[b] | 3 |
| Lubricant[c] | 2 |
| Acetic Acid | 0.01 |
| Ammonium Hydroxide | 0.01 |
| Deinoized water | 85.98 |

[2]Chosen from a group comprising of aminopropyltriethoxysilane,mercaptoproyltrimethoxysilane, acryloyl/methacryloyl caprolactam, ethyl benzoate or any other precursor molecules that in a secondary step react with another molecule such as caprolactam or others to produce an initiator on the surface of the glass.
[a]No additional silane is necessary if the precursor is a silane.
[b]Choice of film formers such as Neoxil 965, Hydroside U-101/201/601 or any other Epoxy or PU-based film formers.
[c]Combination of one or more lubricants from Emerest 2646, Emerest 2661 and Emery 6717.

Procedure—The procedure as disclosed in Example 2 is used. If aminopropyltriethoxysilane is used, the hydrolysis is rapid and acetic acid is not necessary.

The reinforcing fibers and/or flakes that may be used include any type of fiber product used to reinforce natural or organic polymers including chopped fiber strands or pellets (agglomerates), chopped fiber rovings, chopped strands from wound cakes and assembled rovings, gun roving, chopped or long slivers, nonwoven fibrous mats and woven fiber fabrics. The reinforcing fibers may be of any length. For example, the reinforcing fibers may be at least 0.06 inches long up to lengths exceeding 100 feet. The reinforcing fibers may be dry, but they may also contain up to about 0.5 wt. percent moisture or solvent. For example, the reinforcing fibers may contain less than 0.3 wt. percent moisture, less than 0.2 wt. percent moisture, or less than 0.1 wt. percent moisture.

In many of the present embodiments, sized fibers and/or flakes are made and used as reinforcements in polymers formed in situ around the sized reinforcement fibers and/or flakes. One system and method useful in making the sized reinforcing fibers in a wound form is shown in FIG. 1. Fibers 1, including glass or polymer fibers, are formed by passing a molten form of the glass or polymer, etc. through orifices or nozzles on the bottom of a refractory metal bushing 2 heated to the fiberization temperature of the material being fiberized, and the fibers 4 are pulled rapidly downward at speeds exceeding 500-1000 ft./min. to more than 10,000 ft./min to attenuate the fibers to the desired diameter and to quickly cool the fibers 4 with air to below their softening point. A fine mist of water or other cooling fluid is sprayed onto the fibers to help cool them. and the fibers 2 are then pulled into contact with a chemical sizing applicator such as a roller of a chemical sizing applicator 5 where the surfaces of the fibers are coated with one of the chemical sizings of the present embodiments, or another chemical sizing. The chemical sizings may be water based, but other liquids may be used in place of water including organic solvents including ketones, alcohols including ethanol, methanol, esters or others, molten caprolactam with or without an aqueous medium or a combination of water and organic solvents.

The chemically coated, wet fibers are next pulled into contact with a grooved pulley 7 that gathers all of the fibers 4 from the bushing 2 into one or more strands 9. A second grooved pulley 8, either offset from the first grooved pulley 7, or with the strand(s) 9 passing on an opposite side of the pulley 8, or both to provide some additional strand tension for a winder 10 located on the floor of the forming room below and offset from bushing 2. The fiber strands 9 may contain any number of fibers from a few hundred to more than 6000.

In systems for making continuous, wound sized fibers or sized fiber strands, the fibers 4 and the fiber strands 9 may be pulled at the desired speed by a winder, such as the roving winder 10 having a rotating spindle 11 and a removable sleeve 12 on which to wind a roving package 13 having square ends 14 and a relatively smooth outer diameter 15 of a desired size. Following completion of the roving package 13, the roving winder 10 indexes to place another rotating mandrel 11 into place containing a fresh sleeve 12 and the strand(s) 9, are transferred manually or automatically to the fresh sleeve to make another roving package 13 without disrupting the pulling of the strand(s) 9. Instead of a roving winder, a different type of winder for winding cakes, bobbins or other package shapes may be used in this system. After the wet packages, etc. are removed from the winder they are dried to remove all or most of the liquid carrier, to complete any coupling reaction(s) and to cure any film former in the sizing. The dried rovings or yarns are then processed to make the reinforcing fiber and reinforcing roving and yarn products to be used to weave fabrics, to chop or to use to make fiber reinforced polymer composite products and parts.

Figure 2:
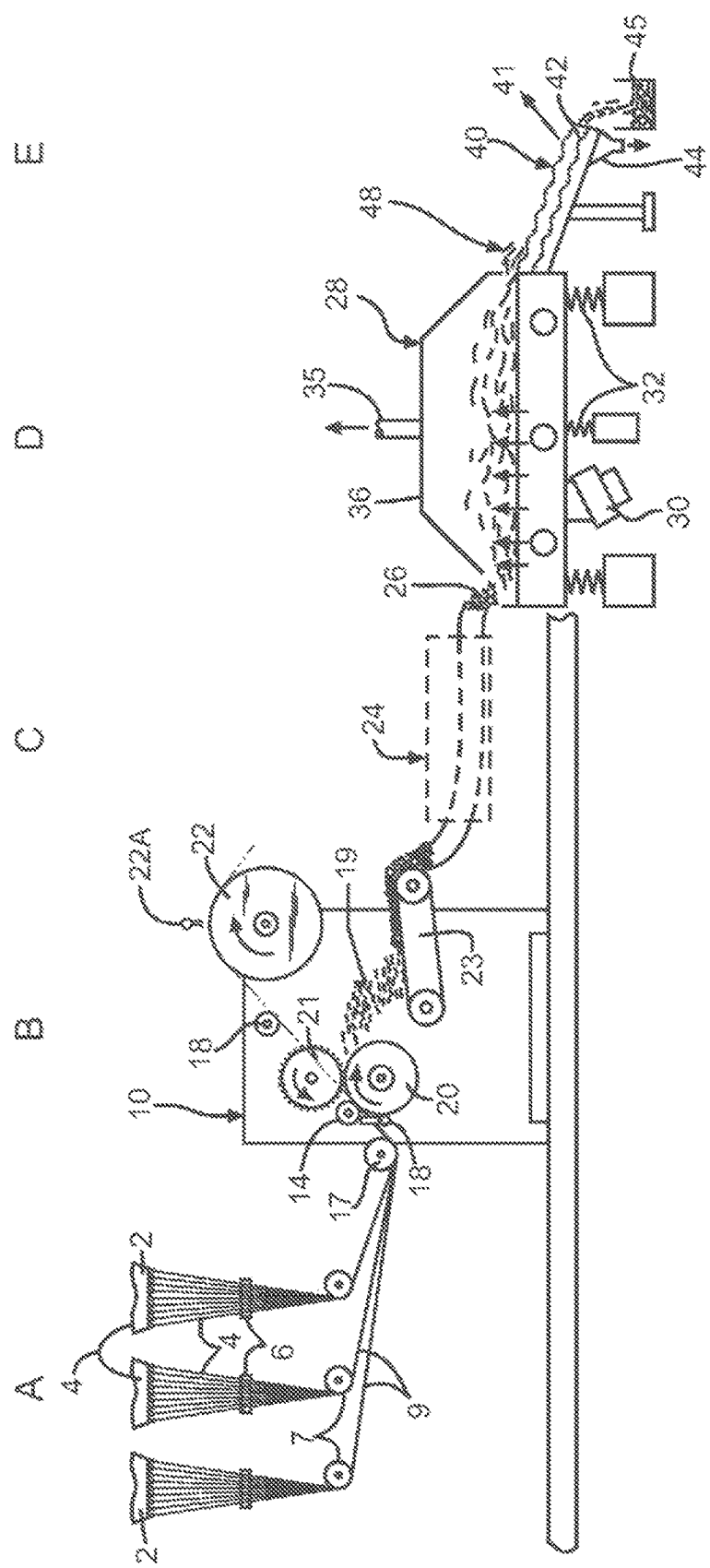
FIG. 2 is a simplified schematic drawing of a system for making desired lengths of chopped reinforcing fibers and fiber strands according to embodiments of the invention.

Other reinforcing fiber products used to make reinforced composite parts or products include wet and dry chopped sized fibers and wet and dry chopped fiber strands. FIG. 2 shows a system used to manufacture wet or dry chopped, sized fibers and fiber strands, or optionally agglomerated wet and dry chopped sized fibers and sized chopped fiber strand products. In FIG. 2, different system portions are labeled as A, B, C, D and E. Portion A is the fiber forming part of the system and may be the same as the fiber forming system shown in FIG. 1, except that in this system the fibers or strands of fibers 9 are pulled around gathering wheels 7 moving away from the turning wheels 7 in a generally horizontal orientation towards a chopper 16. Portion B is a chopper 16 for separating fibers and fiber strands 9 into lengths 19 of about 0.06 inch up to 5 inches long or longer with exemplary lengths being 0.125 inches, 0.25 inches, 0.5 inches, 0.75 inches, 1 inch, 1.25 inches, 1.5 inches, etc. The chopper 16 shown in FIG. 2 includes a guide roll 17, a backup roll 20 with a pulling roll 19 running against it and fibers or fiber strands 9 on the surface of the backup roll. A blade or cutter roll 21 set to cause a plurality of blades mounted in the blade roll 21 to push against the fibers or fiber strands 9 on an elastomeric surface of the backup roll 20, penetrating the elastomeric surface to some depth results in producing the desired lengths of wet, sized fibers or fiber strands 9. Other components include elements for starting a new fiber or a new fiber strand into the chopper 16 without interrupting the running fibers or fiber strands 9 and may include an accelerating roll 22, a sensor 22A to start the accelerator roll and a strand manipulator 18 to pull the new strand into the nip between backup roll 20 and the pulling roll 19 once the new fiber or fiber strand is running at a desired speed.

The chopped fibers and/or fiber strands 19 may be collected on a conveyor belt or vibrating conveyor and may be either packaged wet, used wet close by, or further processed. Portion D is a drying part of the system. One option is to feed the wet, chopped fibers into a dryer like a vibrating fluid bed dryer 28, mounted on a plurality of springs 32 and equipped with one or more vibrators 30. The wet, chopped fibers and/or fiber strands are fed onto a perforated bed having holes therein of a size such that the fibers and/or fiber strands will not fall through, especially as hot air is flowing upward through the holes and into the vibrating, often suspended layer of chopped fibers and/or fiber strands to remove the liquid carrier, complete any coupling reaction(s) and to cure any film former that is on the surface of the fibers. The hot, moist air is exhausted through a stack 35 and a top cover 36 contains the fibers and fiber strands in the dryer 28.

Portion E is an optional sorting and packaging portion of the system. The hot, dry chopped fibers and/or fiber strands 48 may optionally flow into and through a size sorter 40 containing two or more screens 41 and 42 to remove any oversize and under size (fuzz) material from the desired product, discarding the material removed through a chute 44, and to cool the chopped, reinforcing fibers and/or fiber strands before being packaged in packages 45.

Portion C of the system is optional. When it is desired to produce pellets or agglomerates of the chopped fibers and/or fiber strands 19, the latter are fed into an optional agglomerator/pelletizer 24 that will agglomerate a plurality of the chopped fibers and/or fiber strands 19 into separate pellets or football shaped agglomerates and densify the pellets and/or football shaped agglomerates 26 before feeding them into the dryer 28. Optionally, the densified pellets and/or football shaped agglomerates 26 may be packaged wet for shipment or use on the premises.

Figure 3:
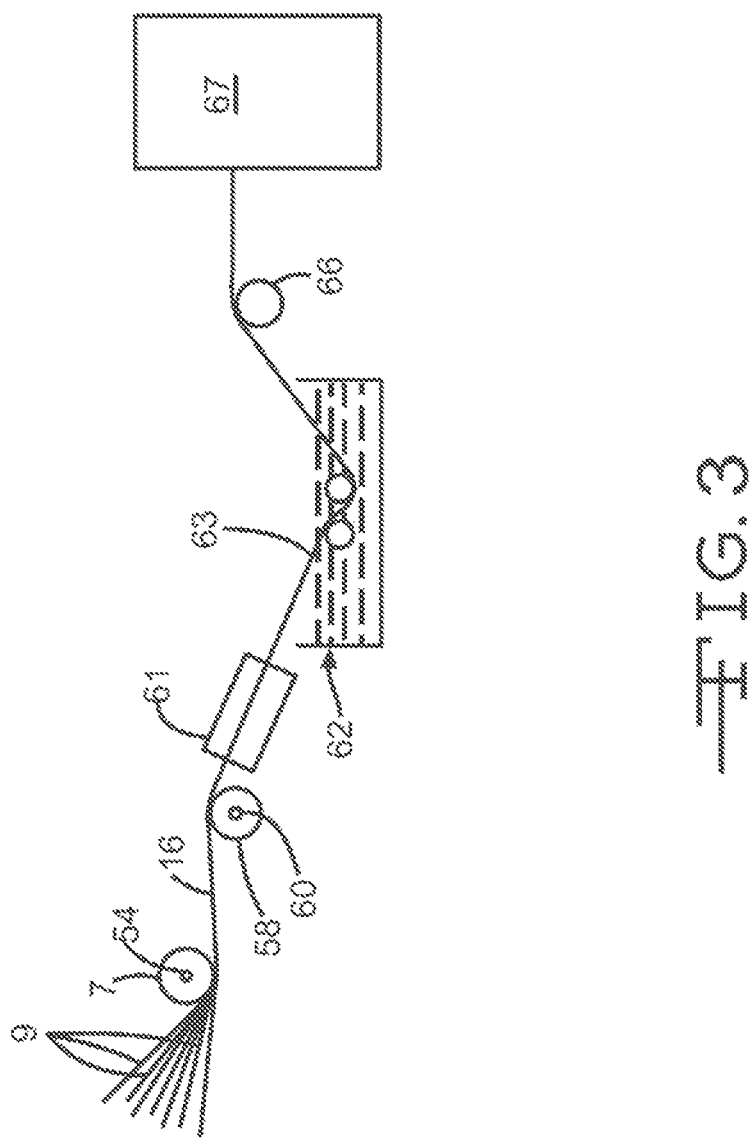
FIG. 3 is a simplified schematic drawing of a system for applying a second size composition to fibers or fiber strands according to embodiments of the invention.

Some of the sized, reinforcing fibers and/or fiber strands of the present embodiments, particularly those using two or more precursors for the PI(s) may use a two step sizing application using different size compositions in the two sizing steps. One system for use along with a system for making first sized fibers, including the systems shown in FIGS. 1 and 2, for making such dual sized fibers and/or fiber strands is shown in FIG. 3. Here wet, sized fibers 9 sized with a sizing composition such as those coming from the systems shown in FIGS. 1 and 2, are gathered and turned with the turning roll 7 rotatable on an axle 54, then optionally onto a second roll 58 rotatable on an axle 60 and through a dryer 61 to optionally remove at least some of the liquid of the first sizing, and/or to gel the first sizing, and then onto other rollers 64 submerged in a different sizing in a container 62. The fiber(s) and/or fiber strands 65 coated with the second sizing composition are pulled from the container 62 by either a winder or a chopper 67. From that point the wound or chopped sized fibers may be used, packaged wet or palletized, agglomerated and used or packaged or dried, optionally sorted, and packaged as described above in the description of FIGS. 1 and 2.

Other reinforcing fiber products include fibrous nonwoven mats and woven fiber fabrics using either the sized reinforcing fibers made in the systems disclosed above, or other reinforcing fibers that are sized with the present sizing compositions during manufacture of the nonwoven mats and fabrics. Weaving systems may be used to weave fabrics and either wet or dry mat forming systems may be used to make the fibrous, reinforcing nonwoven mats. Dry systems may include chopped strand mat systems and continuous fiber strand mat systems. These and other dry forming mat systems may be used.

Figure 4:
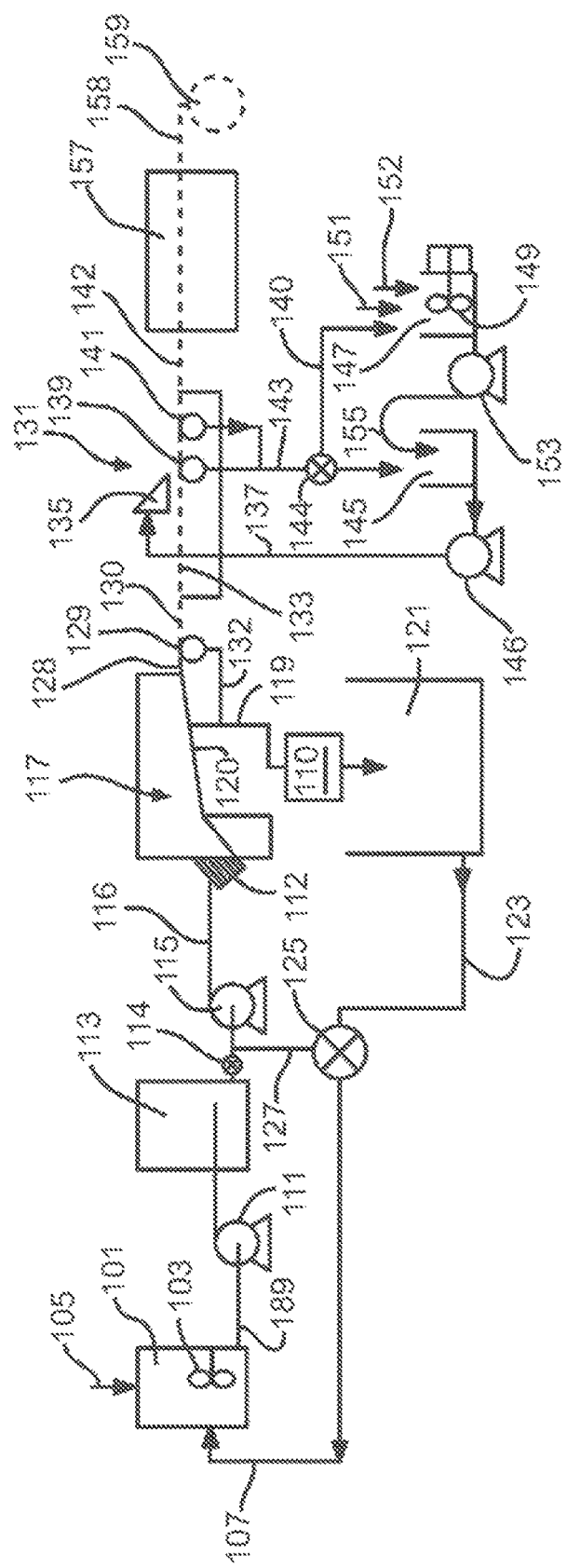
FIG. 4 is a simplified schematic drawing of a system for making a nonwoven mat and applying a sizing to fibers in the nonwoven mat according to embodiments of the invention.

FIG. 4 is a schematic of a wet former system for making multi-layer nonwoven mats except that it contains an optional second stock preparation system. Sized fibers, or other reinforcing fibers and/or fiber strands, particulate or both 105 are fed, for example, continuously, but batch type preparation is also used, into a pulper 101 containing forming liquid, such as an aqueous forming liquid, flowing in a return pipe 107. Mixing takes place in the pulper 101 with an agitator 103 to form a relatively concentrated slurry that exits the pulper 101 through pipe 109 and into a pump 111 that pumps the concentrated slurry into a holding tank 113. The forming liquid is delivered to pipe 107 by pump 125, pumping the forming liquid coming from a pipe 123 and a deairing tank 121. Concentrated slurry is metered out of the holding tank 113 by a pump 115 and variable flow valve 114 where the concentrated slurry is diluted substantially with the forming liquid coming through pipe 126 to a forming pump 127. The substantially diluted slurry, may have a solids concentration of less than about 0.04 percent, flows through pipe 116 to a distribution manifold 112 on a forming box 117.

The slurry flows toward a moving permeable forming belt 20 where the fibers and any particulates in the slurries are formed into a wet, nonwoven web while the forming water flows through the forming belt as return forming liquid 119 and onto the deairing tank 121. A final suction tube assembly 129 under the forming belt 120 near where the wet web is removed from the forming belt 120 removes excess forming liquid from the wet web and returns it through pipe 132 to the de-airing tank 121. The wet web is then transferred to a second moving permeable belt 130 that carries the wet web under an applicator 135, such as a curtain coater type, where a sizing, with or without a binder is applied in an application section 131. Excess sizing and/or binder is removed from the wet, fibrous web or mat with suction tube assemblies 139 and 141 to reduce the sizing and/or binder level in the wet web to the desired level. The coated web is then transferred to an oven belt 142 and passed through an oven 157 where the mat is dried and any film former resin(s) in the sizing and/or binder are cured. The dry mat 158 may then be wound into a roll 159 for packaging or use nearby.

The fibers in the mats containing an optional binder are bound together with a resinous binder, but the nonwoven mat need not contain any binder other than optional film former in the sizing. The binder may be an aqueous mixture of water and one or more resins or polymers and other additives in a solution, emulsion or latex. The sizing, binder or combination is prepared by adding one or more ingredients 151 with a liquid 152, such as water, to a mix tank 147 containing an agitator 149. Excess binder, sizing or mixture removed from the wet web with suction boxes 139 and 141 may also be added to the mix tank 147 by way of return pipe 143. The mixed sizing, binder or mixture of the two is then pumped with pump 153 to a holding tank 145 to supply an applicator pump 146 that meters the sizing, binder or mixture of the two at the desired rate using variable valve 144 to the applicator 135.

Figure 5:
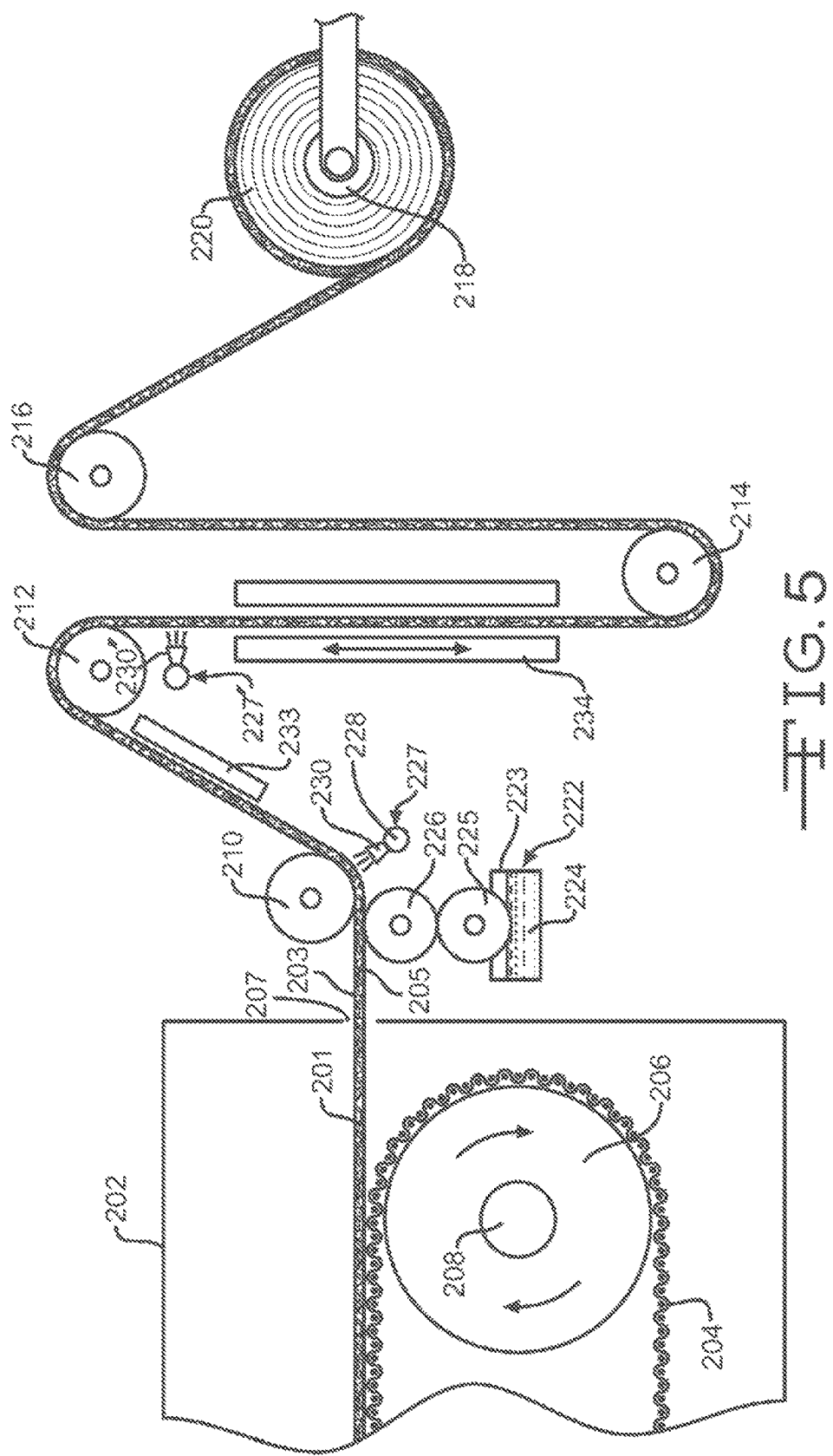
FIG. 5 is a f simplified schematic drawing of a portion of a nonwoven mat system showing an additional system for applying a one or more sizings to a nonwoven fiber mat or to a woven fabric according to embodiments of the invention.

In certain embodiments, a second sizing may be added to the fibers in a nonwoven mat or in a woven fabric. FIG. 5 shows another system useful in adding one or two sizing compositions to the reinforcement fibers in a nonwoven mat or a woven fabric. This system may be used as an alternative to the sizing application disclosed above in the description of FIG. 4, or in addition to that system to add a second sizing composition after the first sizing has been dried on the fibers in the nonwoven mat. For woven fabrics, the system of FIG. 5 may be used to add one or two different sizing compositions to the woven fabric as the fabric comes off of the loom, or in a separate step.

When used with the wet process in FIG. 4, a dryer chain/screen 204 carries the wet to dry, hot nonwoven mat 201 through the dryer 200 driven by a tail pulley 206 mounted on axle 208. The hot, dry mat 203 exiting the dryer may then be wound up into rolls 220 on a mandrel 218 supported by arms 219 of a winder, such as an indexing winder. Other rolls 212, 216 and at least one movable accumulator roll 214 provide enough slack to allow the winder to doff the mat, rotate a finished roll 220 out of position and a fresh mandrel into winding position to start winding a new roll 220. Nonwoven mats may also be made by a dry process and mats made by dry processes may include dry chopped fiber mats and continuous filament mats.

The woven or nonwoven fibrous mats may be very permeable due to the many relatively large pores in the surface and throughout the mats. The permeability of these mats is in the range of about 50 to about 1500. For example, the permeability of the mats may be in the range of about 175 to about 1000 or about 200 to about 800 cubic feet per minute per square foot (ASTM D737 test method).

Referring to FIG. 5, instances where the bottom surface of nonwoven mat, woven or nonwoven scrim and/or woven fabric 203, coming out of an oven 200 as the final step in the process of making such fibrous materials, may be coated with a size composition, such as using a roll over roll coater 223. In a roll-over-roll coater 223 a first roll 225 rotates in a pan 222 containing the liquid size 224, a liquid, where the liquid may be a water medium, and picks up a layer of the size 224 on the surface of the roll 225 and transfers the layer of size 224 to a second, coating roll 226. The coating roll 226 "kisses" the back side of the mat or fabric 203 transferring the size to the fibers, and optionally binder coated fibers, in the mat or fabric. The amount of size applied to the mat or fabric may be controlled by adjusting the concentration of the size 224 and by controlling the amount of liquid size picked up by the first roll 225. The size quickly is moved through the mat or fabric by the size wanting to wet the fibers and then heating with one or more heaters 233, such as a hot air heater, drives off the water or solvent in the sizing, leaving the caprolactam PI on the fibers or the cured binder coating the fibers. The penetration of the surfactant into the mat or fabric to the opposite surface is completed by varying one or more of the non-isocyanate PA concentration in the size 224, the amount of size applied to the mat or fabric 203, the temperature of the hot air in the one or more dryers 233, and the speed of the tail pulley 206.

If additional or more size is desired on the mat or fabric than may be applied with the coater 223, one or more optional other coating devices 227 can be used, either in the place of the coater 223 or in addition to the coater 223. For example, one or more spray jet coaters 227 comprised of a manifold 28 and spaced apart jet nozzles 30 can be used. For example, jet nozzles that form a mist or atomize the size 224 may be used. This system may also be used to apply a size containing one or more precursors for the non-isocyanate PA to the mat or fabric 203.

In embodiments where the fibers in the mat or fabric 203 have a second size containing a different non-isocyanate compound PA or precursor for such applied prior to final drying, a second set of size applicators 227" are shown followed by one or more secondary dryers 234. The dryers 233 and 234 may be located adjacent both surfaces of the mat or fabric 203 if desired. The dryers may be of any suitable type, such as hot forced air heaters, surface combustion heaters or infra-red heaters. In cases where size transfer doesn't matter, it is not necessary that the mat or fabric be completely dry prior to winding into the roll 220, or prior to stacking sheets of the mat or fabric together. Where it is beneficial to apply size 224 to the top surface of the mat or fabric 203, the application equipment is arranged to coat that side instead of the bottom side, using for example, jet spray applicators 227, 227".

The present embodiments simplify the RTM, RIM, VARTM/RIM, (vacuum assisted RTM or RIM), pultrusion, injection molding and filament winding systems and processes by placing the PI and/or catalyst on the surface of the particles of filler and/or pigment and/or on the reinforcement fibers and/or flakes. The cost and added complexity of the equipment needed such as additional resin tanks, heaters, pumps, lines, valves, mixers, etc., and the elimination of such equipment means that the maintenance costs including cleaning and mixing, are substantially reduced. In particular, a process such as Reactive Injection Molding that comprises a modified vertical/horizontal injection molding process is significantly simplified by using a reactive glass surface. A two-component system presents processing challenges for this process due to the difficulties in achieving uniform mixing in an injection molding screw design.

Reactive glass for PA, PBT, PU, other thermosets and thermoplastics may be used as the reinforcing material to create composites using the reactive injection process in a one-pot system.

Where the complex systems currently exist, the present embodiments free up one or more monomer or monomer mixture portion of the system to permit the molding system to make laminate or over-molded parts and/or products by using the first shot to make a Nylon 6 or PBT core or layer and then at the appropriate time, having used the other monomer or monomer mixture equipment to make a second shot of polyurethane or PBT to produce a outer surface or second layer having enhanced properties including one or more of moisture absorption, smoothness, hardness level, etc. In other embodiments a strong thermoset core may be over-molded with a more impact resistant, tougher thermoplastic shell. The examples will describe some of the options for making different composite laminates and parts using a multi-component system where the filler, pigment and/or the reinforcing material is reactive and may be for example, a glass material.

Example 1

Glass fibers or flakes in the form of a woven fabric or non-woven mat or a combination of both are placed in a mold. Several layers of fabric or mat are used to achieve a glass loading of >50%. The glass contains 1 to 3% by weight of triethoxypropylsilane isocyanate-capped caprolactam residue PI on the reinforcement surfaces. The PI is bonded to the glass via the silane linkage. Using a reactive injection molding process in the horizontal or vertical configuration, a mixture of caprolactam and sodium caprolactam catalyst (1-3% by weight with respect to caprolactam) is injected using a one-pot system. The mixture is fed as a solid and it melts during the transfer process wherein the screw elements convey the mixture to the mold and the mixture is injected into and wets the glass fiber fabric layers in the mold. The mold is maintained at 160° C. and polymerization is allowed to occur for 4-10 minutes. The resultant product is a glass reinforced Nylon 6 composite.

A variant of this example is the process of making a glass fiber reinforced PBT composite. In this case, the glass fibers have on their surfaces 0.5-3 wt. %, based on the dry weight of the fibers, of chlorobutyltindihydroxide catalyst. Cyclic butylene terephthalate monomer is then injected into the shaped glass fiber fabric using the one-pot injection molding system, which is suitable because of the use of reactive fibers. Polymerization is allowed to occur in the mold at 190-210° C. for 4-10 minutes to produce a glass fiber reinforced PBT composite.

Example 2

In a two-component injection/infusion system, glass fibers sized with a silane based PI compound for caprolactam polymerization are placed in a mold which is maintained at 160° C. The silane based PI is the reaction product of mercaptopropyltrimethoxysilane and acryloyl caprolactam and is present in the range of 1 to 3 wt. % based on the dry weight of the glass fibers, on the glass fiber surfaces as a dry residue. From one melting vessel, caprolactam mixed with a magnesiumbromide-caprolactam catalyst (2 to 4% by weight) is injected/infused in to the reactive glass fibers previously placed into the mold and polymerization was allowed to occur. After allowing sufficient time for completion of polymerization (4-10 minutes), the mixture from the second melting vessel, comprised of cyclic-butylene terephthalate monomer and a tetraisopropyl titanate catalyst (0.3 to 2% by weight) is injected/infused over the polyamide composite. This mixture then polymerizes in the mold at 190-210° C. and forms a PBT over-layer sandwiching the polyamide composite. This sandwich structure provides the benefit of a tough polyamide core with a strong PBT shell over or surrounding the core.

Example 3

This example is similar to Example 2, and is for an injection-based pultrusion process. Continuous reactive glass fibers in the form of reactive rovings and/or reactive glass mat and/or reactive glass fiber fabric, sized for polyamide polymerization by comprising of 1-3 wt. % of a residue of hexamethylenediisocyanato-capped caprolactam PI by weight, are pulled through a die. A mixture of caprolactam and Na-caprolactam catalyst (1 to 3% by weight) is injected into the reactive glass fibers to cause polymerization at 160° C. with a sufficient pulling speed to allow 4-10 minutes for polymerization to occur. At a further point along the die, the mixture of cyclic butylene terephthalate monomer and 0.5 to 2 weight % of dibutyltin dioxide catalyst is injected to form a layer of PBT over or surrounding the PA 6 composite and heated at 190-210° C. to polymerize the PBT. The pulling speed and die length are adjusted to allow 4-10 minutes for the PBT polymerization process. Optionally, the composite goes through a post-curing process either in a continuous manner in a die or as a stand-alone process in an oven at 160-200° C. to complete the polymerization.

Example 4

In a 3-component injection/infusion system, reactive glass fibers containing a 1 to 3% N-mercapto ureido (caprolactam-capped toluene isocyanate) propyltrimethoxysilane PI, for PA 6 polymerization, residue on their surfaces are made into a fabric, shaped and fixed in a mold. Caprolactam, mixed with 1 to 3% Na-caprolactam catalyst in the molten form was injected from one pot into the reactive fabric and polymerization was allowed to occur on the surfaces of the glass fibers at 160° C. for 4-10 minutes producing a glass fiber reinforced PA 6 composite part. Over that composite part, a standard thermoset material system such as Epoxy/Polyester/Vinylester was processed in a two-pot process that included the resin and the hardener. The thermoset matrix was then formed over the PA 6 core providing a hard surface over a tough, glass fiber reinforced PA 6 inner core material.

Example 5

Similar to example 4, but the glass fibers were sized with 0.5 to 3% of chlorobutyltindihydroxide catalyst for CBT polymerization to form reactive fibers. These reactive glass fibers, in the form of rovings or yarn were then woven into a fabric and this reactive glass fiber fabric was then placed in a mold in a way to form a reinforced part. Next, cyclic butylene terephthalate was injected/infused over the reactive glass fabric and polymerization of PBT was allowed to occur at 190-210° C. for 4-10 minutes. Finally a thermoset matrix was then formed over the glass-reinforced PBT core. In a modification of this embodiment, the thermoset matrix contained reactive glass fibers having a catalyst as a residue of a sizing containing the catalyst on the surfaces of the fibers. Other modifications used reactive glass flakes in place of the reactive fibers in either the first step, the overlay step or both.

Example 6

This example was similar to examples 4 and 5, but instead of the epoxy/vinlyester/polyester systems, a polyurethane system was processed over the glass-reinforced thermoplastic core.

Example 7

In a first step a glass fiber fabric with the reactive component residue on the fibers was placed in the mold and the monomer was injected to react with the reactive component to form a reinforced thermoplastic composite core layer. The mold was built as a two cavity turntable that could rotate 180°. A second layer of a different reactive reinforcement material such as a reactive glass fiber nonwoven mat and/or a reactive glass fiber nonwoven surface veil was placed in the second outer part of the mold and surrounded the core after closing the tool. Then a second component of monomer (different chemistry or similar chemistry but modified such as pigmented, toughened, or other type of modification) was injected into the reactive glass fiber nonwoven mat and/or veil.

The first reactive component was glass fibers sized with 0.5 to 3% benzoyl caprolactam PI. The injection mixture was comprised of caprolactam monomer and 1-4% MgBr-caprolactam catalyst, and polymerization was allowed to occur at 160° C. for 4-10 minutes.

The second reactive component was a glass fiber sized with 0.5 to 3% tributyltin ethoxide catalyst. The monomer mix was comprised of cyclicbutylene terephthalate and other additives such as fillers and pigments. The polymerization conditions were 190-210° C. at 4-10 minutes.

Example 8

A part was produced in a manner similar to that of Example 7, but in this case, a foam was used in parts of the component. The foaming component, e.g. a thermoplastic with a foaming agent or with gas foaming, was injected first into the mold and allowed to expand. Then the second molding step included the reactive reinforcing material and the monomer was injected in an additional space surrounding the foamed material.

Example 9

In cases where using Example 8 is not desirable because the foam would collapse due to the reaction temperature of the monomer, this example offers a solution. To avoid the foam collapsing, the reactive reinforcement material is placed first and the monomer was then injected into the reactive reinforcement to form the reinforced polymer composite. Those portions where a foamed material was desired was kept open by the use of removable cores or blocks in the shape of the desired foamed portion(s). The cores were then moved out of the mold and the foaming material was injected filling the voids left by the cores. Instead of cores or blocks, a second tooling half using a rotational mold could be used.

A multitude of other embodiments are possible including, but not limited to, using reactive fillers and pigments in place of or in addition to the reactive fibers and/or flakes and with non-reactive fibers and/or flakes. The fibers, flakes, filler particles and pigment particles may be of any material used to reinforce, stabilize and/or color and/or to texture thermoplastic and thermoset composite parts or products.

What is claimed is:

1. A method of forming a multi-component reinforced composite, the method comprising:
    forming a particle-reinforced component in a mold, wherein the particle-reinforced component is formed by a first process comprising:
        contacting reactive particles in the mold with a first resin comprising first monomers of a first polymer, wherein:
            the reactive particles have a reactive polymerization promoter chemically bonded or coated on a surface of the reactive particles, and
            the reactive polymerization promoter promotes polymerization of the first monomers; and
        polymerizing the first resin to form a thermoplastic polymer matrix around the reactive particles and form the particle-reinforced component; and
    forming a layer of a polymer-containing component in contact with the particle-reinforced component, wherein the layer of the polymer-containing component in contact with the particle-reinforced component is formed by a second process comprising:
        contacting the particle-reinforced component with a second resin comprising second monomers of a second polymer; and
        polymerizing the second resin in the mold to form the polymer-containing component, wherein:
            the polymer-containing component comprises a thermoset polymer,
            polymerizing the second resin occurs during contact with the particle-reinforced component, and
            the layer of the polymer-containing component surrounds a core comprising the particle-reinforced component.

2. The method of claim 1, wherein the reactive polymerization promoter comprises a polymerization initiator that initiates polymerization of caprolactam monomers, and wherein the first resin comprises caprolactam monomers.

3. The method of claim 2, wherein the first resin further comprises a polymerization catalyst.

4. The method of claim 1, wherein the reactive polymerization promoter comprises a polymerization catalyst that catalyzes polymerization of cyclic 1,4-butylene terephthalate (CBT) into polybutylene terephthalate (PBT).

5. The method of claim 1, wherein the reactive particles comprise glass fibers or glass flakes sized with a sizing composition comprising the reactive polymerization promoter.

6. The method of claim 1, wherein the method further comprises activating the reactive polymerization promoter on the surface of the reactive particles.

7. The method of claim 1, wherein the first process is a thermoset process selected from the group consisting of reactive injection molding, structural reactive injection molding, resin transfer molding, vacuum-assisted resin transfer molding, reactive long fiber injection molding, reactive sheet molding compound, and reactive bulk molding compound.

8. The method of claim 1, wherein the particle-reinforced component comprises a polyamide.

9. The method of claim 1, wherein forming the particle-reinforced component further comprises injecting a foam into the mold.

10. A method of making a glass reinforced composite, the method comprising:
forming a glass-reinforced component, wherein the glass-reinforced component is formed by a first process comprising:
contacting glass fibers with a thermoplastic resin comprising first monomers of a first polymer, wherein:
the glass fibers have a reactive polymerization promoter chemically bonded or coated on a surface of the glass fibers, and
the reactive polymerization promoter promotes polymerization of the first monomers; and
polymerizing the thermoplastic resin to form a polymer matrix around the glass fibers and form the glass-reinforced component; and
forming a polymer-containing component in contact with the glass-reinforced component, wherein the polymer-containing component is formed by a second process comprising:
contacting the glass-reinforced component with a thermoset resin comprising second monomers of a second polymer;
polymerizing the thermoset resin to form the polymer-containing component, wherein:
polymerizing the thermoset resin occurs during contact with the glass-reinforced component, and
the polymer-containing component surrounds the glass-reinforced component.

11. The method of claim 10, wherein forming the glass-reinforced component further comprises injecting a foam into a mold.

* * * * *